United States Patent [19]

Carr et al.

[11] Patent Number: 5,429,747
[45] Date of Patent: Jul. 4, 1995

[54] METHOD FOR TREATMENT AND DECOLORIZATION OF WASTE WATER FROM COSMETIC MANUFACTURING PROCESSES

[75] Inventors: Charles W. Carr, Edgewater; Ralf Zissel, Baltimore, both of Md.

[73] Assignees: University of Maryland, College Park, College Park; Goldwell Cosmetics Inc., Annapolis Junction, both of Md.

[21] Appl. No.: 255,865

[22] Filed: Jun. 7, 1994

[51] Int. Cl.⁶ .............................................. C02F 9/00
[52] U.S. Cl. ................................. 210/650; 210/665; 210/668; 210/669; 210/670; 210/694; 210/917
[58] Field of Search ............... 210/650, 665, 668, 669, 210/694, 917, 670

[56] References Cited

U.S. PATENT DOCUMENTS

| | | | |
|---|---|---|---|
| 1,747,175 | 2/1930 | Mahler | 210/655 |
| 4,049,545 | 9/1977 | Horvath | 210/665 |
| 4,566,986 | 1/1986 | Waldmann | 210/716 |
| 4,758,347 | 7/1988 | Henz et al. | 210/655 |

*Primary Examiner*—Ivars Cintins
*Attorney, Agent, or Firm*—Christopher N. Sears

[57] ABSTRACT

The invention is a method for the treatment and decolorization of waste water incident to the manufacturing of cosmetic products that contains dyestuffs, fatty organic chemicals and other organic chemicals. The method requires a strong base which is added to the waste water at a suitably high temperature to cause flocculation of fatty substances. Then an strong colorless oxidizer is added to reduce the hydrophilic character of the remaining organic chemicals and cause partial decolorization. The resulting waste water is in a state that can then be decolorized with powdered activated carbon. Finally, the powdered activated carbon is separated from the waste water. The decolorized waste water is discharged in compliance with acceptable water quality standards for plant effluents.

16 Claims, No Drawings

METHOD FOR TREATMENT AND DECOLORIZATION OF WASTE WATER FROM COSMETIC MANUFACTURING PROCESSES

FIELD OF THE INVENTION

This invention pertains to a method for the treatment and decolorization of waste water containing dyestuffs and other organic chemicals used in the manufacture of cosmetic products.

BACKGROUND OF THE INVENTION

Known techniques for treating waste water effluent resulting from cosmetic product manufacturing includes evaporation, membrane filtration and super critical oxidation.

Known techniques for treating dyestuff waste water effluent includes use of a strong basic inorganic hydroxide to form a flocculent as taught in U.S. Pat. No. 1,747,175 entitled "Process for Treating Dye Effluents" and in U.S. Pat. No. 4,758,347 entitled "Process for Purifying Dyeing Waste Water" which additionally includes a the method of membrane filtration. These patents can use NaOH in their respective multi-step treatment of industrial waste water to achieve a desired quality of water treatment. Additionally, the U.S. Pat. No. 1,747,175 teaches of using activated carbon filtration for dye removal before the flocculent settles. However, neither of these references provide a method for the effective treatment of untreated cosmetic waste water organic effluent which can also contain organic fatty compounds and other chemicals in addition to dyestuff materials.

Indeed, the present invention requires the use of a strong, colorless and cost effective oxidizing agent for 1) reducing the hydrophilic character of these organic fatty compounds that are present in cosmetic waste water effluent and 2) partially effectuate decolorization of dyestuffs prior to treated effluent discharge into public sewers.

Other U.S. patents that teach of waste water treatment by either flocculation or coagulation, but are materially different from the invention discussed herein include: U.S. Pat. No. 4,566,986 entitled "Flocculating Agents and Processes For Making Them" which uses methods that require very complex inorganic flocculating agents for purifying waste water where cosmetic waste water effluent is just one of the possible applications of this treatment process and U.S. Pat. No. 5,180,497 entitled "Method For Decolorization of Waste Water" which admixes polyvinyl alcohol to the waste water effluent for precipitation of the dyestuffs from the effluent.

SUMMARY OF THE INVENTION

The present invention provides a method for the decolorizing and treatment of cosmetic manufacturing waste water effluent that contains dyestuffs, fatty organic chemicals and other organic chemicals. A strong base is first added to the waste water at suitably high temperature to cause flocculation of the organic fatty substances. Then a strong colorless oxidizer is added for reducing the hydrophilic character of the remaining organic chemicals as well as partially decolorizing the dyestuffs. These initial steps convert the waste water to a state where the remaining dyestuffs can be decolorized by the addition of powdered activated carbon. Finally, the powdered activated carbon is separated from the waste water. The decolorized waste water is discharged in compliance with acceptable water quality standards for plant effluents.

OBJECTS OF THE INVENTION

Accordingly, several objects and advantages of the present invention are:

(a) To provide a process that requires a minimum of equipment and energy needs for treating manufacturing cosmetic waste water effluent for discharge into public sewers.

(b) To provide a process that treats waste water effluent containing dyestuffs incident to the manufacture of cosmetic products such as stick deodorant, lip sticks, lip balms, hair coloring products and camouflage face paint.

(c) To provide a process that can be used in combination with membrane filtration processes.

Still further advantages will become apparent from a consideration of the ensuing detailed description.

DETAILED DESCRIPTION

In treating cosmetic waste water effluent that may contain cetearyl alcohol, sodium cetearyl sulfate, stearic acid monoethanol amide, monoethanolamid of coconut oil fatty acid, propylene glycol monostearate, polyethylene glycol ether of oleyl alcohol, polyethylene glycol of cetyl alcohol, oleic acid, propylene glycol, the waste water effluent is first heated between 100°–500° F. The optimal temperature is about 200° F. The waste water effluent can be introduced into a single tank for batch processing or be treated by a continuous process that requires serially connected tanks with attendant piping and pumping equipment. The method is as follows:

Step (a): Sodium hydroxide is added in proportion to what is required to effectuate flocculation of these materials to form a waxy buoyant solid that separates and is mechanically removed from the waste water. This chemical is consistent with the constituent materials present in the cosmetic products produced that compliments the process. The amounts required are determined by the flocculent end point observed by plant operators.

Step (b): Sodium chlorate, a cost effective strong colorless oxidizing agent is then added to the remaining waste water in sufficient quantities to reduce the hydrophilic character of the remaining fatty organic chemicals in the waste water thereby the powdered activated carbon can be subsequently added without clogging and reduction of its' useful capacity due to the fact that fatty materials are present in the cosmetic waste water. The amounts of sodium chlorate added would be determined by plant operators monitoring of the powdered activated carbon's useful. capacity.

Step (c): The waste water effluent is then cooled to room temperature and powdered activated carbon is added in proper amounts to effect adsorption of the remaining dyestuffs, thereby decolorizing and adsorbing any remaining organic chemical waste substances. The finer the powder size of the carbon, the greater its' useful capacity for adsorbing the dyestuff. The amount of powdered activated carbon added is determined by the clarity of the effluent waste water going into the public sewer. The capacity of powdered activated carbon to adsorb dyestuff can be enhanced in a batch process by first treating the waste water with the powdered activated carbon which has been previously used, and subsequently treating the waste water with virgin powdered activated carbon. The capacity of powdered activated carbon to adsorb dyestuff can also be enhanced by using a fixed bed or counter current methods in a continuous process.

Step (d): The waste water effluent with powdered activated carbon is then passed through a solid liquid separation device to remove the powdered activated carbon with cosmetic waste dyestuff substances, thus yielding decolorized waste water of suitable acceptable quality for disposal in public sewers. The reduction of the hydrophilic nature of the organic chemicals, step (b) above, greatly improves this solid-liquid separation so as to allow the utilization of the most basic and cost effective form of solid liquid separation devices such as cake filtration on surface filters. Other means of solid liquid separation that would be suitable include: deep bed filtration, pressure filtration, vacuum filtration, screening, hydrocyclones sedimentation and centrifugal sedimentation. The activated carbon powder collected by the solid-liquid separation device can be disposed in a conventional manner.

The powdered activated carbon is added after the flocculent waxy material is removed for the following reasons: 1) the flocculent waxy material is in a simple chemical state that allows for recycling of this waxy material, 2) the fatty organic materials can be separated by chemical dosing and flocculation which is much cheaper then using powdered activated carbon, which in turn produces greater overall plant savings, and 3) if the powdered activated carbon were added prior to removal of the flocculent and some powdered activated carbon were to be removed along with the flocculent waxy material, the powdered activated carbon would not be present in the waste water treatment process long enough to maximize its' useful capacity and minimize expense for the overall waste water treatment.

The above process can also be used with membrane filtration process as part of a combined mechanical and chemical treatment of cosmetic waste water effluent. Such a process is taught in U.S. Pat. No. 4,758,347 entitled "Process for Purifying Dyeing Waste Water" by Henz et al. which is hereby incorporated by reference. Although perfect clarity in the waste water may not result when using this membrane filtration process alone and the membrane can be subject to clogging due to the fatty organic materials present in the waste water, this combined process could be suitable in certain cosmetic manufacturing applications. For instance, a permeate cosmetic waste water which results when passing the untreated waste water through membranes would allow for immediate disposal into public sewers without further treatment. The resulting concentrate waste water effluent can be treated in a manner discussed by steps (a)-(d) above.

Although the description above contains many specificities, these should not be construed as limiting the scope of this invention but as merely providing illustrations of some of the presently preferred embodiments of this invention.

We claim:

1. A batch purification process for the decolorization of waste water which contains cosmetic waste comprising dyestuffs, fatty cosmetic materials and combinations thereof comprising the steps of:
   a) providing process purification equipment comprising: i) a tank means for processing and storing unprocessed waste water, ii) an ingress means for the unprocessed waste water, and iii) a discharge means for discharging environmentally acceptable processed waste water from the tank means;
   b) agitating and admixing sodium hydroxide with waste water in the tank means;
   c) heating the waste water from step b) to between 100°-500° F. thereby causing a flocculent waste material to separate and float on the waste water's surface;
   d) removing the flocculent waste material from the waste water from step c);
   e) admixing sodium chlorate with the waste water from step d) thereby causing: i) a reduction in the hydrophilic nature of fatty materials contained in the cosmetic materials and ii) partial decolorization of the waste water;
   f) admixing powdered activated carbon with the waste water from step e) thereby causing removal of remaining dyestuffs;
   g) passing the waste water from step f) through a solid-liquid separation device for removal of the powdered activated carbon thereby producing purified water; and
   h) discharging the purified waste water through the discharge means for disposal.

2. The process of claim 1 wherein the cosmetic materials are selected from the group consisting of: ceteraryl alcohol, sodium cetearyl sulfate, stearic acid monoethanol amide, monoethanolamid of coconut oil fatty acid, propylene glycol monostearate, polyethylene glycol ether of oleyl alcohol, polyethylene glycol of cetyl alcohol, oleic acid, and propylene glycol.

3. The process of claim 1 further including a step of concentrating the waste water prior to step b) by a membrane filtration means.

4. The process of claim 1 wherein the waste water in step c) is heated to approximately 200° F.

5. The process of claim 1 further including a step of regenerating spent activated carbon from step g) and recycling regenerated activated carbon to step f).

6. A continuous purification process for the decolorization of waste water which contains cosmetic waste comprising dyestuffs, fatty cosmetic materials and combinations comprising the steps of:
   a) providing process purification equipment comprising: i) a tank means for processing and storing unprocessed waste water, ii) an ingress means for the unprocessed waste water, and iii) a discharge means for discharging environmentally acceptable processed waste water from the tank means and iv) means for pumping and piping the waste water,
   b) agitating and admixing sodium hydroxide with waste water in the tank means;
   c) heating the waste water from step b) to between 100°-500° F. thereby causing a flocculent waste material to separate and float on the waste water's surface;
   d) removing the flocculent waste material from the waste water from step c);
   e) admixing sodium chlorate with the waste water from step d) thereby causing: i) a reduction in the hydrophilic nature of fatty materials contained in the cosmetic materials and ii) partial decolorization of the waste water;

f) admixing powdered activated carbon with the waste water from step e) thereby causing removal of remaining dyestuffs;

g) passing the waste water from step f) through a solid-liquid separation device for removal of the powdered activated carbon thereby producing purified water; and h) discharging the purified water for disposal through the discharge means.

7. The process of claim 6 wherein the cosmetic materials are selected from the group consisting of: ceteraryl alcohol, sodium cetearyl sulfate, stearic acid monoethanol amide, monoethanolamid of coconut oil fatty acid, propylene glycol monostearate, polyethylene glycol ether of oleyl alcohol, polyethylene glycol of cetyl alcohol, oleic acid, and propylene glycol.

8. The process of claim 6 further including a step of concentrating the waste water prior to step b) by a membrane filtration means.

9. The process of claim 6 wherein the waste water in step c) is heated to approximately 200° F.

10. The process of claim 6 further including a step of regenerating spent activated carbon from step g) and recycling regenerated activated carbon to step f).

11. The process of claim 6 wherein the powdered activated carbon in step f) is admixed by a counterflow means with the waste water entering through the ingress means thereby optimizing the useful capacity of the activated carbon.

12. The process of claim 6 wherein the powdered activated carbon in step f) is admixed by a moving bed thereby optimizing the useful capacity of the activated carbon.

13. The process of claim 6 wherein the powdered activated carbon in step f) is admixed by a fixed bed thereby optimizing the useful capacity of the activated carbon.

14. A process for the decolorization of waste water which contains cosmetic waste comprising dyestuffs, fatty cosmetic materials and combinations thereof comprising the steps of:

a) agitating and admixing sodium hydroxide with waste water in a tank means;

b) heating the waste water from step a) to between 100°–500° F. thereby causing a flocculent waste material to separate and float on the waste water's surface;

c) removing the flocculent waste material from the waste water from step b);

d) admixing sodium chlorate with the waste water from step c) thereby causing: i) a reduction in the hydrophilic nature of fatty materials contained in the cosmetic materials and ii) partial decolorization of the waste water;

e) admixing powdered activated carbon with the waste water from step d) thereby causing removal of remaining dyestuffs;

f) passing the waste water from step e) through a solid-liquid separation device for removal of the powdered activated carbon thereby producing purified water; and g) discharging the purified water for disposal.

15. The method of claim 14 wherein the cosmetic materials are selected from the group consisting of: ceteraryl alcohol, sodium cetearyl sulfate, stearic acid monoethanol amide, monoethanolamid of coconut oil fatty acid, propylene glycol monostearate, polyethylene glycol ether of oleyl alcohol, polyethylene glycol of cetyl alcohol, oleic acid, and propylene glycol.

16. The process of claim 14 wherein the waste water in step b) is heated to approximately 200° F.

* * * * *